Oct. 9, 1945.  M. D. RIGTERINK  2,386,633
CERAMIC MATERIAL
Filed Oct. 10, 1944

INVENTOR
M. D. RIGTERINK
BY
B. H. Jackson
ATTORNEY

Patented Oct. 9, 1945

2,386,633

UNITED STATES PATENT OFFICE 2,386,633

CERAMIC MATERIAL

Merle D. Rigterink, Summit, N. J., assignor to Bell Telephone Laboratories, Incorporated, New York, N. Y., a corporation of New York Application October 10, 1944, Serial No. 557,965

20 Claims. (Cl. 106—46)

This invention relates to ceramic material, and more particularly to fired ceramic material possessing highly advantageous properties the constituents of which when calculated as oxides comprise oxides of silicon, zirconium if desired, aluminum, boron if desired, and three or more oxides of the alkaline earth metals.

The ceramic material of the present invention is of the porcelain type, because when its constituents are calculated as oxides the proportions of silicon dioxide and aluminum oxide relative to each other and to other constituents are similar to the relative proportions of silicon dioxide and aluminum oxide in the ceramic materials commonly known as porcelain and made from clay, flint and feldspar.

While ceramic material embodying the present invention may have properties rendering it advantageous for employment for various purposes, it may be produced to have high direct and alternating current electrical insulation resistance and low dielectric loss properties at low and high voltages and at low and high temperatures, so that it may be employed to advantage for electrical insulating purposes. Indeed, because it may be produced to have such properties and moreover a surface which provides firm adherence for carbon deposited thereon by thermal decomposition of a carbonaceous gas, such as a hydrocarbon gas, the ceramic material may be employed to great advantage as a ceramic base body for deposited carbon resistors. For illustrative purposes the ceramic material of the invention will be discussed in connection with such use, although it may be employed for other purposes.

In the manufacture of such a resistor, a ceramic base body of suitable shape is usually heated in the presence of a carbonaceous gas, such as methane or benzene, to a temperature sufficient to decompose the gas and deposit a layer of carbon on the surface of the ceramic body. In the resistor, terminals are connected to the ends of the carbon layer which acts as the resistance material.

Use as a ceramic base in such a resistor imposes rigorous requirements on a ceramic material. The material must have high direct current insulation resistance at low and high voltages; and if the resistor is to be employed in alternating current circuits, the ceramic material should have a high alternating current resistance and low dielectric loss properties even at high frequencies and at low and high voltages. The material must not only have such properties at low temperatures but must retain such properties even at elevated temperatures, for often deposited carbon resistors operate at elevated temperatures.

The ceramic material should be substantially non-porous, i. e., free of pores in which can be deposited substances such as carbon which would impair the stability of the resistor. The ceramic material should be capable of forming a body having a very high degree of surface perfection to permit the deposition thereon of a uniform layer of carbon; that is, the surface should be free from pin-holes, cracks, blebs, iron spots and heterogeneities of any sort, as well as from scratches, die marks and the like. Furthermore, the surface should be such that the carbon adheres firmly thereto.

The ceramic material, moreover, should be at least fairly strong and tough to resist stresses of use, and should be capable of being extruded or otherwise readily formed into intricate shapes such as rods, tubes or washers which are the usual shapes of carbon resistors. It should have a low or moderate coefficient of thermal expansion to prevent cracking on cooling after initial firing or on heating during carbon deposition, and to prevent cracking or substantial dimensional changes on heating or cooling during use. The material should be capable of being manufactured to any size within close limits of reproduction on a commercial scale. The material moreover should be capable of being formed of readily available raw materials providing a broad firing range of the ceramic material for ease in manufacture on a commercial scale with ordinary equipment.

Steatite ceramic materials, i. e., those formed of talc as a major constituent, in general are not useful for bases for carbon resistors, since it is difficult if not impossible to form of such steatite ceramic material bodies with surfaces of sufficient uniformity and adherence for carbon to permit the formation of useful carbon layers. Bodies formed of steatite ceramic material apparently inherently have surfaces characterized by poor adherence for deposited carbon.

Known ceramic materials of the zircon type in general are not satisfactory for use as bases for carbon resistors because the surfaces of bodies formed of such materials usually contain pinholes and pimples apparently caused by decomposition and partial volatilization of one or more of the ingredients at the firing temperature after the surface has already fused over. Furthermore, the raw materials of which the body is made often contain impurities which reduce during the deposition of the carbon and form spots of oxides which catalyze the decomposition of the carbonaceous gas so that the film of deposited carbon has a speckled appearance and portions of different thicknesses and resistances.

Porcelain bodies of the usual type formed of clay, silica and feldspar are undesirable for use as bases for carbon resistors because they contain alkali ions resulting from the presence of alkali compounds in the feldspar. These alkali ions reduce the insulation resistance of the ceramic material, particularly at elevated temperatures.

The present invention provides a ceramic material which is free of these disadvantages of other types of ceramic material and which possesses characteristics rendering it very advantageous for use as a material for a deposited carbon resistor base. It may readily be made to have at both low and high temperatures excellent direct current insulation resistance at low and high voltages, and excellent alternating current insulation resistances and low dielectric losses at low and high voltages and frequencies; these advantages are largely made possible because the material contains no alkali metal compounds. Ceramic materials embodying the present invention may be readily made into bodies having surfaces which are free of pin-holes, cracks, blebs, iron spots or other blemishes or heterogeneities and which are smooth but of a microscopic or submicroscopic roughness which mechanically keys deposited carbon to the surface and thus provides excellent adherence. The ceramic material may be made to be substantially non-porous and to have good mechanical strength. It may be readily formed by usual procedures into bodies of intricate shapes, and from readily available raw materials providing a broad firing range in the ceramic material so that bodies of substantially identical properties may be readily reproduced. In general a ceramic material embodying the invention has a low coefficient of thermal expansion. The ceramic material also has excellent resistance to thermal shock.

The manufacture, composition, characteristics and advantages of ceramic material embodying the invention will be discussed in more detail in connection with the accompanying drawing in which.

Figure 1:
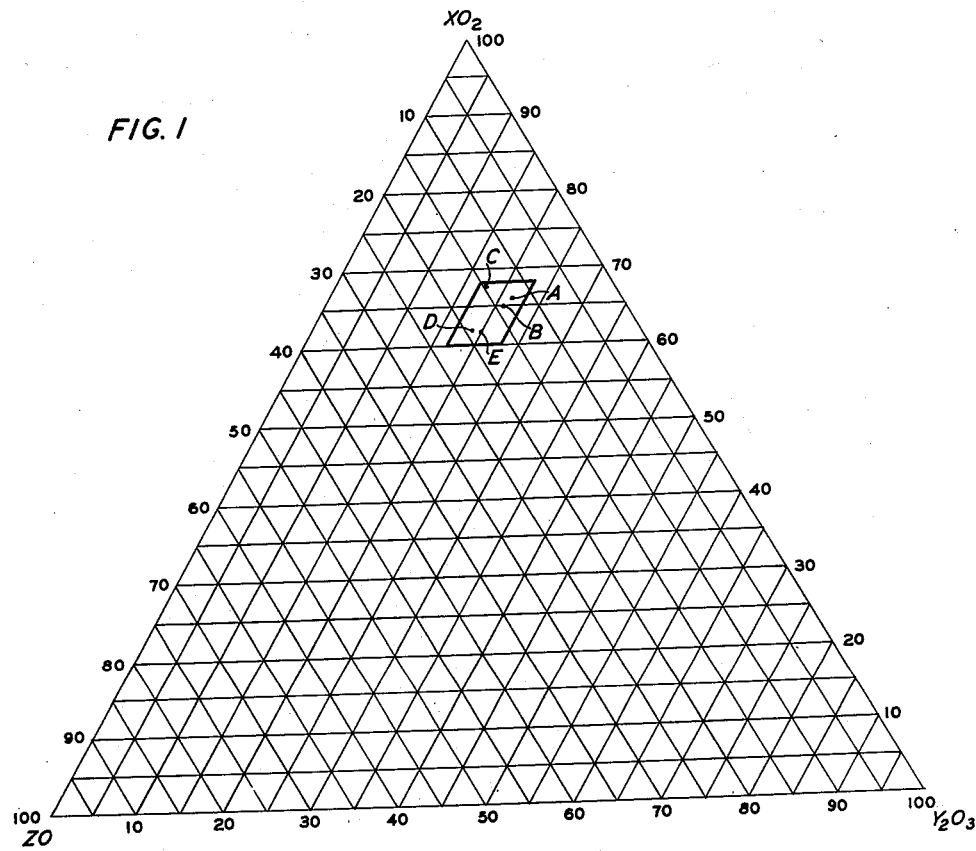
Fig. 1 is a mol per cent triaxial diagram showing the compositions of ceramic materials, embodying the invention.

The ceramic material of the invention essentially comprises constituents which, when calculated as oxides, form a composition falling within the area bounded by the parallelogram indicated on the triaxial diagram of Fig. 1. This diagram is an $XO_2$—$Y_2O_3$—$ZO$ mol per cent diagram in which $XO_2$ represents silicon dioxide $SiO_2$ alone, or silicon dioxide with a minor proportion of zirconium dioxide $ZrO_2$; $Y_2O_3$ represents aluminum oxide $Al_2O_3$ alone or aluminum oxide and a minor proportion of boron oxide $B_2O_3$; and ZO represents the sum of at least three oxides of alkaline earth metals, e. g., beryllium oxide BeO, magnesium oxide MgO, calcium oxide CaO, strontium oxide SrO, and barium oxide BaO. As indicated above, a minor proportion of the silicon dioxide may be replaced by its equivalent zirconium dioxide and a minor proportion of the aluminum oxide may be replaced by its equivalent boron oxide; these substituents broaden the firing range somewhat. The area on the triaxial diagram in which lie the compositions of the ceramic materials of the invention is the parallelogram approximately bounded by the parallel lines indicating 60 and 68 mol per cent of $XO_2$ and 17 and 23 mol per cent of $Y_2O_3$.

In determining the mol percentages of the oxide constituents of a given ceramic material, the percentage by weight of each constituent of the ceramic material is divided by the molecular weight of the constituent, thus providing a quotient number for each constituent. The resulting quotient numbers are added together and the mol per cent of each constituent is obtained by dividing the quotient number for said constituent by the sum of the quotient numbers and multiplying by 100.

Calculated on this basis, the ceramic material of the present invention essentially comprises between about 60 and about 68 mol per cent of $XO_2$, between about 17 and about 23 mol per cent of $Y_2O_3$, and a remainder of at least three alkaline earth oxides. Advantageously, it essentially comprises only $SiO_2$, $Al_2O_3$, and the remainder of at least three alkaline earth oxides.

The ceramic material may also contain small amounts of substances, usually expressible as oxides, other than the oxides of silicon, aluminum, the alkaline earth metals, boron and zirconium; such other oxides advantageously are present in amounts no greater than about 1 per cent by weight of the fired ceramic material. Such other substances may be introduced into the ceramic material by small amounts of materials added in the raw materials to increase plasticity or broaden the firing range, or by impurities in the raw material of which the ceramic material is made. Such impurities, calculated as oxides, may be ferric oxide, ferrous oxide, sodium oxide, potassium oxide, titanium oxide or other substances. To render the ceramic material particularly advantageous for electrical insulating purposes, it should be made of raw materials of high purity which contain little or no alkali metal compounds. It has been found that as little as 0.25 per cent of the oxides of one or more of the alkali metals will cause a noticeable change in electrical properties of the ceramic material. An alkali metal oxide content of more than about 0.5 per cent based on the weight of the ceramic material in general should be avoided since it will harmfully affect the electrical properties of the material. Most advantageously, there is no alkali metal present as the oxide or otherwise. Iron oxides do not as harmfully affect the electrical properties as do the alkali oxides, but are undesirable because they cause surface spots which adversely affect the deposition of carbon. The small amounts of such other substances which may be present in the ceramic material of the present invention are included in the $XO_2$, $Y_2O_3$ and ZO oxides of the mol per cent triaxial diagram. For the above reasons it is desirable to select carefully the raw materials for their purity, or to purify them. In particular, it is desirable to subject the raw materials to a magnetic separation treatment to reduce or eliminate iron-containing impurities.

The ranges of proportions of the constituents of the ceramic material shown on the triaxial diagram appear to be quite critical. Fired ceramic materials the constituents of which form compositions lying above the area shown in the triaxial diagrams of the drawing are inferior to the ceramic materials of the invention since they appear to have inferior dielectric properties and inferior thermal shock properties, and are excessively glassy so that the carbon adherence properties are substantially less than those of the ceramic materials of the invention. For good adherence of deposited carbon layers, a relatively high degree of crystallinity is required, although an appreciable amount of glass is desirable.

Fired ceramic materials the constituents of which form compositions lying below the area shown on the triaxial diagram of the drawing are inferior to the ceramic materials of the invention because in general it is difficult, if not impossible, to make ceramic materials of such compositions which have the desired smoothness and low porosity for use as bases for deposited carbon resistors.

Fired ceramic materials having compositions lying to the left of the area shown on the triaxial diagram in general are characterized by a tendency for their surfaces to hydrate and by substantially less resistance to chemical action than ceramic materials embodying the invention. Such surface acteristics are undesirable since they deleteriously affect the adeherence of the carbon to the surface and the resistance properties of a carbon resistor having a base formed of such ceramic material.

Fired ceramic materials having compositions lying to the right of the area shown on the triaxial diagram of the drawing are inferior to the ceramic matrials embodying the invention since they require firing temperatures considerably higher than those required for the ceramic materials of the present invention, since they can be made non-porous only with difficulty, if at all and hence in general are too porous to serve as bases for deposited carbon resistors, and since they have a glass content which is too low for the necessary smooth surface required for good adherence of the carbon.

The presence of at least three alkaline earth oxides in the constituents calculated as oxides of a ceramic material embodying the present invention, is of pronounced advantage in providing a broader firing range than would otherwise be the case; with fewer than three alkaline earth oxides, the firing range would be too narrow to permit ready commercial production of the ceramic material. Moreover, because the ceramic material of the invention contains alkaline earth ions rather than corresponding proportions of the alkali metal ions, the electrical resistance properties of the ceramic material of the invention are superior. In general each alkaline earth oxide should be present in an amount corresponding to at least 1 mol per cent of the composition of the ceramic material if it is to have a noticeable beneficial effect.

Figure 2:
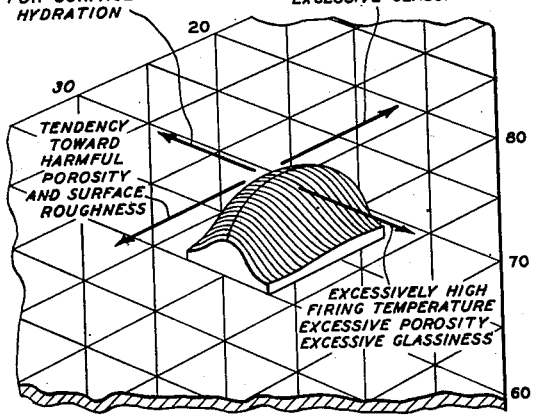
Fig. 2 is a diagram showing in perspective the area on the triaxial diagram of Fig. 1 representing the compositions of ceramic materials embodying the invention and a peak in said area representing a combination of desired properties.

It is aparent from the above that fired ceramic materials having compositions such that when their constituents are calculated as oxides they fall within the area indicated on the triaxial diagram of the drawing and having at least three alkaline earth oxides in the proportions indicated above, possesses the best combination of properties of all ceramic materials having compositions falling in the vicinity of the area outlined on the triaxial diagram of the drawing. In other words, the combination of desired properties appears to be a peak for ceramic materials having compositions lying within the area described on the triaxial diagram. This is illustrated by Fig. 2 of the drawing, which represents in perspective and to an enlarged scale the portion of the triaxial diagram of Fig. 1 containing the area including the compositions of the invention, and a peak in said area which diagrammatically but quite accurately depicts the combination of desired properties. The arrows and their legends indicate the undesired or harmful properties possessed by ceramic materials, the compositions of which lie outside of the area of the compositions of the invention.

Ceramic material embodying the present invention physically comprises a substantial proportion of a crystalline phase and a substantial proportion of a glassy phase; in general each phase constitutes at least 30 per cent by volume of the ceramic material. The small crystals constituting the crystalline phase are cemented together by the glass to form a strong body. It appears that the crystals are primarily of cordierite or similar complex silicate type. The glass apparently is a complex glass containing three or more alkaline earth metal compounds.

Ceramic material embodying the present invention advantageously and usually is dense and substantially non-porous. Such material is preferred for use as a base for deposited carbon resistors since it contains no pores in which may be deposited carbon or other materials which could deleteriously affect the resistance characteristics of the resistor. However, it is possible to provide a porous structure, if one is desired, as by underfiring the ceramic material or by incorporating in the raw materials during mixing a substantial amount of an organic substance such as wood flour or the like which on firing is burned out and leaves a porous ceramic structure.

In general, any raw materials which upon firing will produce a ceramic material of the composition indicated above may be employed. Thus, a ceramic material embodying the present invention may be made by the mixing and firing of oxides or carbonates or other compounds which on firing will form the oxides, in such proportions that the proportions of oxides indicated on the triaxial diagram will result. It is advantageous, particularly for economical reasons, to prepare the ceramic material of the present invention to as great an extent as possible from naturally occurring raw materials. Thus the alumina and a portion of the silica present in the fired ceramic material may be provided by a raw material such as clay which also provides plasticizing properties useful for the forming of the bodies. The alkaline earth oxides may be introduced from naturally occurring alkaline earth oxides or artifically prepared alkaline earth oxides such as BeO, or from compounds which will form oxides on firing such as the alkaline earth carbonates, sulphates, or from the silicates of the alkaline earths.

It is particularly advantageous to form ceramic material embodying the invention from raw materials essentially comprising a clay such as kaolin, silica preferably in the form of flint, and three or more alkaline earth oxides, or compounds which on firing will produce three or more alkaline earth oxides. These raw materials are readily available and by proper mixing and firing can be readily made into a ceramic material embodying the invention and particularly having a surface which is substantially free of imperfections and which has exceptionally good adherence for a carbon film deposited thereon.

The formation of ceramic material embodying the invention having such a surface and other desirable properties is facilitated if all or substantially all of the alkaline earth oxides or their oxide-producing compounds, with a portion of the clay or other alumina or silica containing materials, are mixed together in a finely divided form and calcined at a temperature high enough to cause substantial chemical reaction of such materials but not high enough to cause substantial vitrification of such materials. The calcine is then finely divided and mixed with the other raw material constituents and fired to form the final ceramic material. The use of such a finely divided calcine is advantageous for several reasons. It promotes the reaction of the alkaline earth components with the other components of the raw material mixture and thus increases the uniformity and density of the ceramic material and shortens the required firing time. It greatly reduces the shrinkage occurring during firing since the calcining operation removes the volatilizable components of the calcined materials before the final firing. It promotes the formation of a highly uniform, perfect surface having excellent adherence for carbon.

The raw materials may be put into the form for firing by the usual ceramic processes. If a calcine of the alkaline earth oxides is first prepared, a mixture of finely divided raw material ingredients of the calcine is formed as by dry or wet ball milling or other mixing; the mixture is then fired to a calcining temperature. The temperature is to a certain extent determined by the raw material ingredients and their proportions in the calcine, but in general lies between about 1100° C. and about 1250° C. The calcine is then ground wet or dry, as by a ball mill, to a finely divided state. Advantageously the particle size is quite small, on the order of 200 mesh or smaller.

The raw materials for the ceramic material, which may include clay, finely divided flint, and the finely divided calcine prepared as described above, may be mixed together and formed into a body suitable for firing by any suitable process. As an example, the raw materials may be ball-milled wet and the resulting slip or water suspension of ingredients may be dewatered by a suitable filter; if desired, prior to dewatering the slip may be passed through a magnetic separator to remove iron impurities. The filter cakes may then be dried completely, granulated in conventional apparatus, and, if desired, mixed with a suitable substance which increases plasticity or provides a binding action to increase the strength of the bodies prior to firing; any one of several organic substances such as methyl cellulose or the like, which is completely burned out on firing, may be used. The granulated mixture may be formed into a body of the desired shape by extrusion in the moist state, by die-pressing, or by casting a slip of the raw materials. The formed body, after drying, is then fired. As another example, the raw materials including the finely divided calcine, may be mixed dry by a conventional pan mixer or muller, then wet to form a stiff mud, kneaded in a pug mill, and then formed into a body of the desired shape for firing by an extruding or die-pressing procedure. Other processes could of course be employed to mix and form the raw materials into a body suitable for firing.

In general, the raw material body is fired at a temperature lying between about 1150° C. and about 1300° C. for a time sufficient to vitrify completely the material. While the firing temperature of a ceramic material embodying the invention lies within this range, the most advantageous firing temperature for each composition is dependent upon the composition and may be readily determined therefor. In general, it is advisable to keep the maximum firing temperature in the vicinity of but below the temperature at which blebs tend to form; advantageously the maximum temperature should be between about 5° C. and about 15° C. below that at which blebs begin to form. As was indicated above, the presence of three or more alkaline earth oxides provides a firing range which is sufficiently broad for satisfactory commercial operations; it is advantageous if the firing temperature be controlled to lie in a range of 20° C. below the maximum temperature indicated above. Lower temperatures in general tend to result in increased porosity and a lack of surface glass. It appears that improved dielectric properties result if the ceramic materials are fired in a non-oxidizing atmosphere, i. e., neutral or reducing atmosphere.

It appears that the fusions, reactions, inversions and crystallizations occurring during firing and cooling take place rather slowly so that a relatively long firing cycle is desirable; in general the time required for firing and cooling is determined by the thickness of the body. For a body about ¼ inch thick, a firing cycle involving slow heating substantially uniformly for about six hours to the maximum temperature, a soak for about two hours at this temperature, and slow cooling for from about six to eighteen hours is satisfactory. The cooling rate should be such that the ceramic material formed is substantially crystalline but contains a substantial proportion of glass.

During firing the ceramic material shrinks moderately, generally between about ten and fifteen per cent.

The resulting material, when produced as indicated above, is a white to light gray body which is dense, substantially non-porous, hard, tough and strong, and has a smooth surface of excellent carbon adherence properties, and which has the excellent electrical insulation and other characteristics described above. It has a dielectric constant lying between about 4.5 and about 6.

For the purposes of illustration, the following examples are presented of the manufacture and characteristics of several ceramic materials embodying the invention; in each case the electrical resistance and dielectric loss properties were determined as described in applicant's Patent No. 2,332,343 of October 19, 1943. That is, the tests were carried out on discs of the ceramic material about 0.1 inch thick having fused silver coatings applied to their faces to form electrodes. The values for direct current resistance were determined by the direct deflection galvanometer method. The values for "Q," indicating the dielectric loss properties for alternating currents, were determined according to the method and apparatus described by Thurnauer and Badger in the Journal of the American Ceramic Society, January 1940, pages 9 to 12; the term "Q" designates the ratio of reactance to resistance, and is inversely proportional to the dielectric loss.

*Example 1*

On a weight basis, 60 parts of a high purity kaolin, 10 parts each of finely divided magnesium carbonate, calcium carbonate, strontium carbonate, and barium carbonate were thoroughly mixed wet in a small ball mill for about 4 hours. The mixture was then fired in a clean sagger to a temperature of about 1150° C. for about 4 hours. The resulting calcine was then ground wet in a ball mill until a minimum of 95 per cent would pass through a 325 mesh screen.

On a weight basis, 35 parts of this finely divided calcine, 50 parts of the same kaolin used above, and 15 parts of finely divided flint 95 per cent of the particles of which would pass through a 325 mesh screen were mixed for about 20 hours in a ball mill with sufficient water to make a slip. The slip was then passed through a magnetic filter to remove iron impurities and subsequently dewatered in a pressure filter. The filter cakes were then completely dried and granulated in a comminuting machine after which a small amount of methyl cellulose in solution form was mixed with the ingredients. Rods about ¼ inch in diameter were formed by extrusion to be fired into bases for carbon resistors; discs about 0.075 inch thick were formed by pressing of the mixture at about 4 tons per square inch.

The rods and discs were then fired in a gas-fired furnace according to a schedule in which approximately 6 hours were taken to reach the maturing temperature of about 1230° C., then held at that temperature for about 4 hours, and then slowly cooled over a period of about 14 hours to room temperature. The constituents of the fired ceramic material, calculated as oxides, corresponded to a mol per cent composition of about 66.2 mol per cent of $SiO_2$, 21.7 mol per cent of $Al_2O_3$, 4.3 mol per cent of MgO, 3.5 mol per cent of CaO, 2.5 mol per cent of SrO, and 1.8 mol per cent of BaO. This composition corresponds to the point "A" on the triaxial diagram of the drawing.

The fired bodies were hard, strong, and non-porous. They contained a substantial proportion of small crystals cemented by a substantial proportion of glass. They had smooth, unblemished surfaces. When the rods were cut to lengths convenient for resistors and heated in a carbonaceous gas such as methane to a temperature sufficient to crack the gas, a highly uniform layer of carbon was deposited thereon. This layer firmly adhered to the rods, which indicated that the surfaces of the rods had a submicroscopic surface roughness which keyed the carbon to the ceramic body. Excellent carbon resistors were made from the carbon coated rods by applying metal terminals to the ends thereof.

Resistance and dielectric loss tests of the fired ceramic material in the form of discs by the methods indicated above showed that the ceramic material had the following characteristics:

| Temperature | Specific resistance in ohm-cm. |
|---|---|
| 25° C | $3.96 \times 10^{12}$ |
| 143° C | $1.86 \times 10^{11}$ |
| 254° C | $1.08 \times 10^{9}$ |
| 354° C | $7.84 \times 10^{6}$ |

| | Dielectric loss—values of Q | | |
|---|---|---|---|
| | 100 kc. | 300 kc. | 1000 kc. |
| 25° C | 659 | 687 | 719 |
| 250° C | 60 | 98 | 136 |
| 350° C | 8 | 17 | 34 |

The kaolin employed in the production of the bodies of this example was a high purity Florida kaolin of the following weight per cent composition: $SiO_2$—47.0; $Al_2O_3$—36.8; $Fe_2O_3$—0.8; CaO—0.15; MgO—0.2; $TiO_2$—0.18; alkalis—0.24; loss on ignition—15.0. The flint was practically completely $SiO_2$, and the other ingredients were of high purity.

Example 2

This example relates to the production of a ceramic material comprising three alkaline earth oxides. A finely divided calcine was formed from 60 parts by weight of the kaolin of Example 1, 15 parts by weight of magnesium carbonate, 15 parts by weight of calcium carbonate, and 10 parts by weight of barium carbonate by the steps described in Example 1 involving mixing, calcining and grinding.

This finely divided calcine in the amount of 35 parts by weight, 50 parts by weight of the kaolin of Example 1, and 15 parts of finely divided (325 mesh) flint were processed as in Example 1 by being mixed wet, magnetically treated, dewatered, and formed into bodies which were fired to the temperature and according to the cycle described in Example 1.

The constituents of the fired ceramic material of the bodies calculated as oxides, essentially comprised 65.1 mol per cent of $SiO_2$, 21.3 mol per cent of $Al_2O_3$, 6.4 mol per cent of MgO, 5.4 mol per cent of CaO and 1.8 mol per cent of BaO, and form a composition indicated by the point "B" on the triaxial diagram of the drawing.

The fired bodies were hard, strong, non-porous, and contained a substantial proportion of small crystals cemented by a substantial proportion of glass. The surfaces of the bodies were smooth, free of blemishes, and displayed pronounced carbon-adherence properties.

Resistance and dielectric loss tests of the fired ceramic material in the form of discs by the methods indicated above resulted in the following data:

| Temperature | Specific resistance in ohm-cm. |
|---|---|
| 80° C | $1.11 \times 10^{14}$ |
| 140° C | $5.16 \times 10^{13}$ |
| 254° C | $7.30 \times 10^{10}$ |
| 347° C | $5.54 \times 10^{9}$ |

| | Dielectric loss—values of Q | | |
|---|---|---|---|
| | 100 kc. | 300 kc. | 1000 kc. |
| 25° C | 761 | 785 | 806 |
| 250° C | 72 | 115 | 155 |
| 350° C | 13 | 23 | 47 |

Example 3

A calcine was prepared by mixing, firing, and grinding as in Example 1, 40 parts by weight of the kaolin of said example, 10 parts of calcium carbonate, 10 parts of strontium carbonate, 10 parts of barium carbonate, and 30 parts of talc. The talc was a high purity California talc.

The finely divided calcine in the proportion of 35 parts by weight, 50 parts by weight of kaolin, and 15 parts by weight of finely divided (325 mesh) flint were mixed wet, dewatered, formed into bodies, and fired as described in Example 1, the only difference being that the firing temperature was 1250° C.

With its constituents calculated as oxides, the composition of the fired ceramic material was approximately represented by the point "C" and essentially comprised 67.8 mol per cent of $SiO_2$, 17.8 mol per cent of $Al_2O_3$, 7.5 mol per cent of MgO, 3.2 mol per cent of CaO, 2.2 mol per cent of SrO, and 1.7 mol per cent of BaO. The fired ceramic material was hard, non-porous, and contained a substantial proportion of crystalline phase and a substantial proportion of glassy phase. The bodies formed of the material had smooth unblemished surfaces which displayed excellent adherence for carbon deposited by decomposition of a carbonaceous gas.

The ceramic material had excellent electrical insulating properties at low and high temperatures, and at low and high voltages of both direct and alternating currents.

*Example 4*

In preparing the ceramic material of this example, a calcine was prepared from, on a weight basis, 40 parts of the kaolin of Example 1, 15 parts of magnesium carbonate, 15 parts of calcium carbonate, 15 parts of strontium carbonate, and 15 parts of barium carbonate; the ingredients were mixed, fired, and ground to a finely divided state as described in Example 1.

The resulting calcine in an amount of 35 parts by weight, 50 parts by weight of the kaolin of Example 1, and 15 parts by weight of finely divided (325 mesh) silica were mixed wet, dewatered, formed into bodies, and fired according to the procedure described in Example 1, the bodies being fired at a maximum temperature of 1290° C. for 4 hours.

The fired ceramic material had a mol-per cent composition approximately represented by the point "D" on the triaxial diagram of Fig. 1, and essentially comprising 61.7 mol per cent of $SiO_2$, 19.2 mol per cent of $Al_2O_3$, 6.7 mol per cent of MgO, 5.7 mol per cent of CaO, 3.8 mol per cent of SrO, and 2.9 mol per cent of BaO.

The fired ceramic bodies had substantially the same physical characteristics as those of Example 1, including a high adherence for deposited carbon. The excellent electrical insulating properties at low and high temperatures, and at low and high voltages from the following data obtained from tests carried out as described above on discs of the ceramic material:

| Temperature | Specific resistance in ohm-cm. |
|---|---|
| 66° C | $3.46 \times 10^{13}$ |
| 148° C | $2.33 \times 10^{13}$ |
| 243° C | $5.38 \times 10^{11}$ |
| 349° C | $6.89 \times 10^{9}$ |

|  | Dielectric loss—values of Q | | |
|---|---|---|---|
|  | 100 kc. | 300 kc. | 1000 kc. |
| 25° C | 1850 | 2100 | 2165 |
| 250° C | 161 | 221 | 279 |
| 350° C | 39 | 64 | 88 |

*Example 5*

This example illustrates a ceramic material embodying the invention containing five alkaline earth compounds.

A calcine was prepared by mixing, firing and grinding, as described in Example 1, a mixture consisting of, by weight, 55 per cent of the kaolin of Example 1, 5 per cent of beryllium oxide, 10 per cent of magnesium carbonate, 10 per cent of calcium carbonate, 10 per cent of strontium carbonate, and 10 per cent of barium carbonate.

In the manufacture of the fired ceramic material, 35 parts by weight of this finely divided calcine, 50 parts by weight of the kaolin of Example 1, and 15 parts by weight of finely divided flint of a particle size of less than 325 mesh were mixed, formed into bodies, and fired in accordance with the procedure of Example 1 at a maximum firing temperature of 1195° C. for 4 hours.

When its constituents were calculated as oxides, the fired ceramic material essentially comprised 61.7 mol per cent of $SiO_2$, 20.0 mol per cent of $Al_2O_3$, 6.8 mol per cent of BeO, 4.1 mol per cent of MgO, 3.4 mol per cent of CaO, 2.3 mol per cent of SrO, and 1.7 mol per cent of BaO, approximately represented by the point "E" on the triaxial diagram of Fig. 1.

The fired ceramic material was hard, dense, non-porous, and strong; it physically comprised substantial proportions of small crystals and glass. The bodies had smooth, unblemished surfaces displaying an excellent adherence for carbon deposited thereon by a process involving heating the bodies in an atmosphere of a carbonaceous gas.

The ceramic material had good electrical insulating properties at low and high temperatures and at low and high voltages of both direct and alternating currents. This is apparent from the following data derived from tests on discs carried out as described above:

| Temperature | Specific resistance in ohm-cm. |
|---|---|
| 78° C | $3.31 \times 10^{13}$ |
| 150° C | $6.92 \times 10^{11}$ |
| 252° C | $2.46 \times 10^{9}$ |
| 356° C | $8.44 \times 10^{7}$ |

|  | Dielectric loss—values of Q | | |
|---|---|---|---|
|  | 100 kc. | 300 kc. | 1000 kc. |
| 25° C | 427 | 495 | 565 |
| 250° C | 23 | 51 | 84 |

*Example 6*

This example illustrates a ceramic material embodying the invention formed of raw materials including a ball clay and a small amount of an added material to increase the plasticity of the raw material mix.

In the manufacture of this ceramic material, 35 parts by weight of the finely divided calcine of Example 1, 30 parts of the kaolin of Example 1, 20 parts of a ball clay, 15 parts of finely divided flint, and 1.5 parts of an inorganic plasticizing agent were mixed, formed into bodies and fired as in Example 1 to a maximum temperature of 1225° C. for 4 hours.

The ball clay was a Kentucky clay having the following weight per cent composition: $SiO_2$—51.7; $Al_2O_3$—31.2; $TiO_2$—1.8; $Fe_2O_3$—1.2; MgO—0.5; CaO—0.2; $H_2O$—0.4; $Na_2O$—0.6; loss on ignition—12.3. The plasticizing agent consisted of calcite crystals of micronic size in a matrix of colloidal magnesium silicate and magnesium fluoride.

When its constituents were calculated as oxides, the fired ceramic material had a mol per cent composition essentially corresponding to that of the material of Example 1, and represented by the point "A" on the triaxial diagram of the drawing.

The electrical insulation properties of this ceramic material were excellent, although somewhat inferior to those of the ceramic material of Example 1.

Ceramic materials embodying the invention and having approximately the mol per cent composition of the material of Example 1 appears to have exceptionally advantageous electrical insulation properties and carbon adherence properties, and therefore may be used to particular advantage in carbon resistors.

Figure 3:
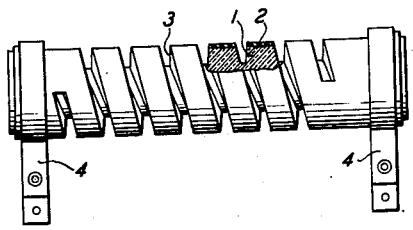
Fig. 3 represents a carbon resistor having a base formed of a ceramic material embodying this invention.

Fig. 3 depicts an illustrative form of carbon resistor embodying the ceramic material of the invention. The resistor comprises a cylindrical rod 1 formed of a fired ceramic material embodying the invention and having on its surface a layer 2 of carbon deposited on the ceramic material by decomposition of a carbonaceous gas. A helical groove 3 cut through the carbon layer 2 serves to lengthen the resistance path through the carbon. Metal terminals 4 make electrical contact with the ends of the carbon strip and provide means for mounting the resistor.

Although the ceramic materials of the present invention have been primarily described above in connection with uses as bases for deposited carbon resistors, they may be employed for other purposes. Their characteristics render them useful for general electrical insulation purposes, as well as for non-electrical purposes.

Various modifications may be made in the methods and raw materials discussed above, and various other methods and raw materials than those discussed above may be employed for making the ceramic materials of the invention without departing from spirit of the invention.

In the appended claims the term "oxides" as employed in describing the raw or starting materials from which the ceramic material of the invention is made is intended to include, besides the oxides as such, compounds which upon firing, will result in such oxides.

It is intended that the appended claims shall cover whatever features of novelty reside in the invention.

What is claimed is:

1. A fired ceramic material which physically comprises a substantial proportion of small crystals and a substantial proportion of glass cementing together said crystals, which ceramic material chemically essentially comprises constituents which calculated as oxides form a composition falling within the parallelogram shaped area on an $XO_2$—$Y_2O_3$—$ZO$ mol per cent triaxial diagram approximately bounded by the parallel lines indicating 60 and 68 mol per cent of $XO_2$ and the parallel lines indicating 17 and 23 mol per cent of $Y_2O_3$, in which diagram $XO_2$ represents a substance chosen from the group consisting of $SiO_2$ and $SiO_2$ plus a minor proportion of $ZrO_2$, $Y_2O_3$ represents a substance chosen from the group consisting of $Al_2O_3$ and $Al_2O_3$ plus a minor proportion of $B_2O_3$ and $ZO$ represents the sum of at least three alkaline earth oxides each constituting at least one mol per cent of the composition, and which ceramic material contains no more than a small amount of alkali metal oxide.

2. The ceramic material of claim 1 which contains no more than about 0.5 per cent by weight of alkali metal oxide.

3. The ceramic material of claim 1 in which the crystals are essentially cordierite crystals.

4. A substantially non-porous body formed of the ceramic material of claim 1 having a smooth surface which is free of blemishes and which has firm adherence for carbon deposited on the surface by decomposition of a carbonaceous gas.

5. The ceramic material of claim 1 in which the crystals comprise at least about 30 per cent and the glass comprises at least about 30 per cent by volume of the ceramic material.

6. A fired ceramic material which physically comprises a substantial proportion of small crystals and a substantial proportion of glass cementing together said crystals, which ceramic material chemically essentially comprises constituents which calculated as oxides essentially comprise between about 60 and about 68 mol per cent of $SiO_2$, between about 17 and about 23 mol per cent of $Al_2O_3$, and a remainder of at least three alkaline earth oxides each constituting at least one mol per cent of the composition, and which ceramic material contains no more than a small amount of alkali metal oxide.

7. A substantially non-porous fired ceramic material which physically comprises a substantial proportion of small crystals and a substantial proportion of glass cementing together said crystals, said ceramic material being formed of raw materials containing no more than a small amount of alkali metal compounds which essentially comprise clay, silica, and a calcined mixture comprising at least three alkaline earth compounds, which raw materials are mixed in such proportions that the constituents of the fired ceramic material calculated as oxides essentially comprise between about 60 and about 68 mol per cent of $SiO_2$, between about 17 and about 23 mol per cent of $Al_2O_3$, and a remainder of at least three alkaline earth metal oxides each constituting at least one mol per cent of the composition.

8. The ceramic material of claim 7 which contains no more than about 0.5 per cent by weight of alkali metal oxide.

9. The ceramic material of claim 7 in which the crystals are essentially cordierite crystals.

10. A body formed of the ceramic material of claim 7 having a smooth surface which is free of blemishes and which has firm adherence for carbon deposited on the surface by decomposition of a carbonaceous gas.

11. The ceramic material of claim 7 in which the crystals comprise at least about 30 per cent and the glass comprises at least about 30 per cent by volume of the ceramic material.

12. A fired ceramic material which physically comprises a substantial proportion of small crystals and a substantial proportion of glass cementing together said crystals, which ceramic material when its constituents are calculated as oxides chemically essentially comprises about 66 mol per cent of $SiO_2$, about 22 mol per cent of $Al_2O_3$, and about 12 mol per cent of at least three alkaline earth oxides each constituting at least one mol per cent of the composition, and which ceramic material contains no more than a small amount of alkali metal oxide.

13. A substantially non-porous, fired ceramic material of excellent electrical insulating properties at low and high temperatures having a surface substantially free of imperfections and possessing excellent adherence for carbon deposited thereon, which physically comprises a substantial proportion of small crystals and a substantial proportion of glass cementing together said crystals, which ceramic material when its constituents are calculated as oxides chemically essentially comprises about 66.2 mol per cent of $SiO_2$, about 21.7 mol per cent of $Al_2O_3$, about 4.3 mol per cent of MgO, about 3.5 mol per cent of CaO, about 2.5 mol per cent of SrO, and about 1.8 mol per cent of BaO, which ceramic material contains no more than a small amount of alkali metal oxide.

14. An electrical resistance element comprising a body of fired ceramic material, a layer of carbon on a surface of said body which has been deposited from decomposition of a carbonaceous gas, and electrically conductive means electrically connected to said carbon layer, said fired ceramic material physically comprising a substantial proportion of small crystals and a substantial proportion of glass cementing together said crystals, and chemically essentially comprising constituents which calculated as oxides form a composition falling within the parallelogram-shaped area on an $XO_2$—$Y_2O_3$—$ZO$ mol per cent diagram approximately bounded by the parallel lines indicating 60 and 68 mol per cent of $XO_2$ and the parallel lines indicating 17 and 23 mol per cent of $Y_2O_3$, in which diagram $XO_2$ represents a substance chosen from the group consisting of $SiO_2$ and $SiO_2$ plus a minor proportion of $ZrO_2$, $Y_2O_3$ represents a substance chosen from the group consisting of $Al_2O_3$ and $Al_2O_3$ plus a minor proportion of $B_2O_3$, and $ZO$ represents the sum of at least three alkaline earth oxides each constituting at least one mol per cent of the composition, which ceramic material contains no more than a small amount of alkali metal oxide.

15. The method of forming a body of a fired, substantially non-porous ceramic material having good electrical insulation properties and a surface possessing good adherence for carbon deposited by decomposition of a carbonaceous gas, and physically comprising a substantial proportion of small crystals and a substantial proportion of glass cementing together said crystals, which method comprises firing together a mixture of finely divided raw materials in proportions such that their constituents after firing and when calculated as oxides essentially comprise a composition falling within the parallelogram-shaped area on an $XO_2$—$Y_2O_3$—$ZO$ mol per cent triaxial diagram approximately bounded by the parallel lines indicating 60 and 68 mol per cent of $XO_2$ and the parallel lines indicating 17 and 23 mol per cent of $Y_2O_3$, in which diagram $XO_2$ represents a substance chosen from the group consisting of $SiO_2$ and $SiO_2$ plus a minor proportion of $ZrO_2$, $Y_2O_3$ represents a substance chosen from the group consisting of $Al_2O_3$ and $Al_2O_3$ plus a minor proportion of $B_2O_3$, and $ZO$ represents the sum of at least three alkaline earth oxides each constituting at least one mol per cent of the composition, and which raw materials contain no more than a small amount of alkali metal oxide, said firing involving a heating rate, maximum temperature and cooling rate such that substantial proportions of crystals and glass are formed.

16. The method of claim 15 in which at least part of said raw materials are calcined before being formed into the mixture which is fired to form said ceramic material.

17. The method of claim 15 in which the heating and cooling rate are such that a completely vitrified body is formed.

18. The method of claim 15 in which the maximum firing temperature is in the vicinity of but below the temperature at which blebs tend to form.

19. The method of forming a body of a fired substantially non-porous ceramic material having good electrical insulation properties and a surface possessing good adherence for carbon deposited by decomposition of a carbonaceous gas, and physically comprising a substantial proportion of small crystals and a substantial proportion of glass cementing together said crystals, which method comprises firing a mixture of raw materials, which contain no more than a small amount of alkali metal compounds, essentially comprising clay, finely divided silica, and a finely divided calcine comprising at least three alkaline earth compounds, in proportions such that the constituents of the fired ceramic material calculated as oxides essentially comprise between about 60 and about 68 mol per cent of $SiO_2$, between about 17 and about 23 mol per cent of $Al_2O_3$, and a remainder of at least three alkaline earth oxides, said firing involving a heating rate, maximum temperature, and cooling rate such that said substantial proportions of crystals and glass are formed.

20. The method of claim 19 in which the maximum firing temperature is in the vicinity of but below the temperature at which blebs tend to form.

MERLE D. RIGTERINK.